United States Patent [19]

Faust et al.

[11] Patent Number: 4,915,958

[45] Date of Patent: Apr. 10, 1990

[54] HIGH-BASE GUM COMPOSITION WITH EXTENDED FLAVOR RELEASE

[75] Inventors: Steven M. Faust, Stanhope; Subraman R. Cherukuri, Towaco, both of N.J.

[73] Assignee: Warner-Lambert Company, Morris Plains, N.J.

[21] Appl. No.: 292,283

[22] Filed: Dec. 30, 1988

Related U.S. Application Data

[63] Continuation-in-part of Ser. No. 939,918, Dec. 10, 1986, Pat. No. 4,872,884.

[51] Int. Cl.$^4$ .............................................. A23G 3/30
[52] U.S. Cl. ...................................... 426/3; 426/548; 426/804
[58] Field of Search .......................... 426/316, 548, 804

[56] References Cited

U.S. PATENT DOCUMENTS

| | | | |
|---|---|---|---|
| 4,045,581 | 8/1977 | Mackay et al. | 426/3 |
| 4,085,227 | 4/1978 | Mackay et al. | 426/3 |
| 4,156,716 | 5/1979 | Wagenknecht et al. | 426/3 |
| 4,157,401 | 6/1979 | Stroz et al. | 426/3 |
| 4,160,820 | 7/1979 | Wagenknecht et al. | 426/3 |
| 4,170,632 | 10/1979 | Wagenknecht et al. | 426/3 |
| 4,170,633 | 10/1979 | Wagenknecht et al. | 426/3 |
| 4,248,895 | 2/1981 | Stroz et al. | 426/3 |
| 4,271,198 | 6/1981 | Cherukuri et al. | 426/3 |
| 4,328,249 | 5/1982 | Mackay et al. | 426/3 |
| 4,335,100 | 6/1982 | Robyt et al. | 426/3 |
| 4,357,354 | 11/1982 | Kehoe et al. | 426/3 |
| 4,371,549 | 2/1983 | Cherukuri et al. | 426/3 |
| 4,590,075 | 5/1986 | Wei et al. | 426/5 |
| 4,656,039 | 4/1987 | Weiss et al. | 426/5 |
| 4,786,491 | 11/1988 | Patel | 426/5 |
| 4,792,453 | 12/1988 | Reed et al. | 426/5 |

*Primary Examiner*—Jeanette Hunter
*Attorney, Agent, or Firm*—Daniel A. Scola

[57] ABSTRACT

A chewing gum composition is disclosed which exhibits extended flavor release as well as improved chewing sensation. The composition is prepared with a high base content ranging from about 50% to about 90% by weight and up to about 4% by weight of a flavor component. The composition is particularly suited for the preparation of high base, low calorie products, as the base appears to releasably retain the flavor such that a desired flavor sensation continues for periods of upwards of 10 to 15 minutes or more. The base formulation facilitates the preparation of a flavored gum with high base content without the need for increasing the content of flavor added to the composition.

18 Claims, 1 Drawing Sheet

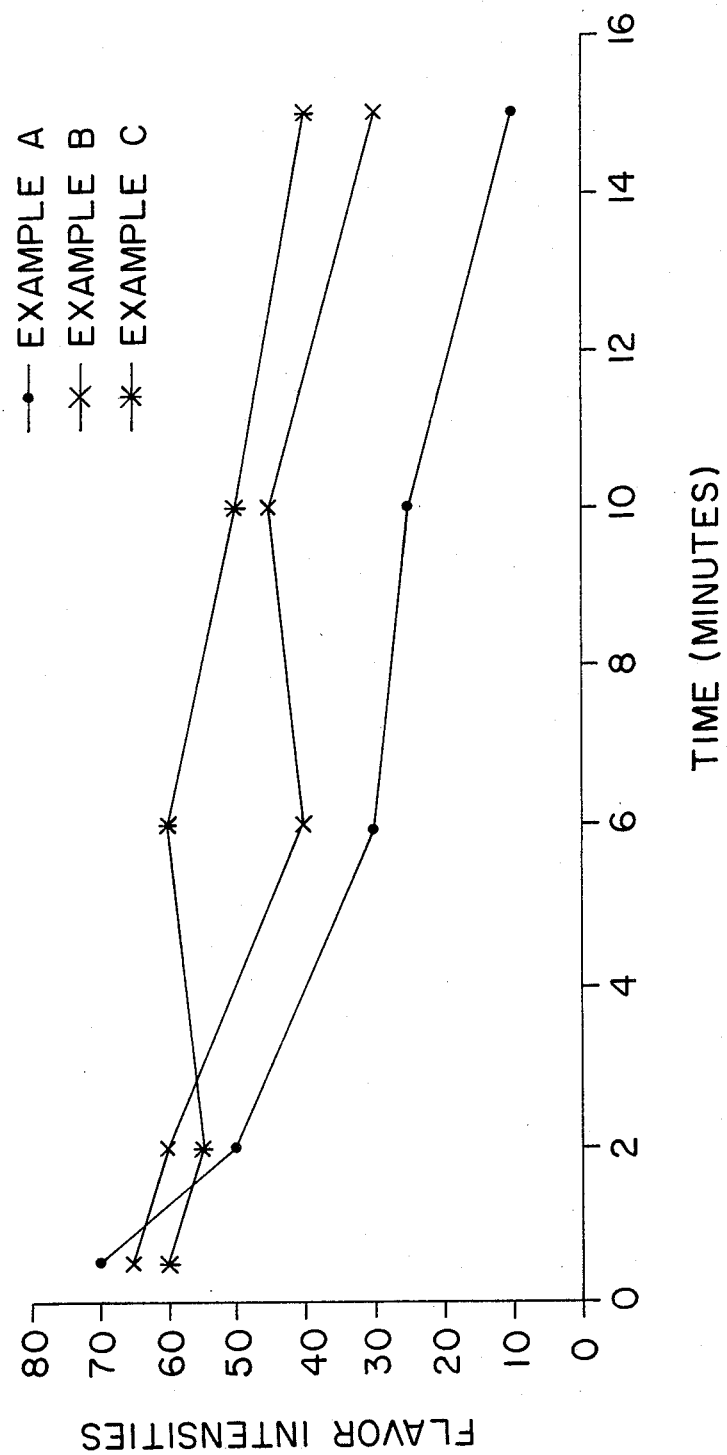

HIGH-BASE GUM COMPOSITION WITH EXTENDED FLAVOR RELEASE

CROSS-REFERENCE TO RELATED APPLICATION

The present application is a Continuation-in-Part of co-pending application Ser. No. 939,918, filed Dec. 10, 1986, now U.S. Pat. No. 4,872,884 by Subraman Rao Cherukuri and Gul Mansukhani for "Reduced Calorie Chewing Gum Base and Compositions Containing the Same", the disclosure of which is incorporated herein by reference. Applicants claim the benefit of this Application under 35 U.S.C. §120.

BACKGROUND OF THE INVENTION

The present invention relates generally to chewing gum compositions, and particularly to chewing gum compositions capable of being prepared with prolonged flavor release.

Most chewing gum compositions contain a generally water-insoluble gum base, water-soluble sweeteners that are either natural or artificial, and a flavoring that may be added in a variety of forms. Also, the gum may contain various additives such as plasticizers, softeners and bulking agents to improve consistency and to enhance the chewing experience.

A commonly noted deficiency in chewing gums remains the relatively rapid exhaustion of the flavor sensation during chewing. This deficiency is most pronounced in the instance of chewing gums, as flavor loss frequently occurs within 5 to 7 minutes after chewing commences, and the flavor taste is further reduced thereafter. One of the causes of this loss is the general tendency for the bolus to retain large percentages of the flavor even during mastication. Thus for example, an average of 50–70% of the flavor ingredient added to a given gum composition during its formulation may remain trapped in the spent gum base.

Efforts to compensate for this reduced flavor sensation have included the addition of higher than normal amounts of flavor or sweetener to the formulation, and the preparation and use of flavors having controlled water solubility or other release characteristics, or the addition of sweeteners to extend the flavor sensation. None of the approaches broadly recited above and specifically referenced hereinbelow have succeeded in appreciably extending flavor release.

Generally, the flavor component regardless of how added to the gum composition is entrapped and retained by gum base ingredients. This entrapment renders the flavor unavailable as discussed above. High base chewing gum compositions generally render a hard chew and are apt to retain more flavor than lower base-containing compositions, thereby having less available for release during chew.

Efforts to arrest flavor entrapment in the gum base turned to encapsulation. Accordingly, flavors were encapsulated in many of the same ingredients in the gum base toward which the flavors have exhibited affinity, such as the resin, elastomer and vinyl polymer components, as well as other suitable film formers and similar agents. The encapsulated flavors still suffer from the drawbacks and deficiencies of the prior art however, as a large quantity of the flavor is still retained by the base, and the release of the flavor from the encapsulating matrix is frequently incomplete.

A full discussion of the prior art with respect to the extension of flavor is found in U.S. Pat. No. 4,590,075 to Wei et al., the disclosure of which is incorporated by reference. More particularly, the patentees discuss the preparation of encapsulated flavors which are added together with a quantity of a non-confined hydrophobic flavor oil to a suspension agent before formulation in a chewing gum (U.S. Pat. No. 3,920,849 to Marmo et al.); the encapsulation of flavor in high molecular weight material such as polyvinyl acetate (U.S. Pat. No. 3,826,847 to Ogawa et al.); the preparation of a flavor composite by crosslinking the flavor with a water-insoluble hydrophilic polymer such as hydroxyethyl acrylate (U.S. Pat. No. 3,761,286); the preparation of microencapsulated flavor particles and their dispersion in a slurry on the surface of a chewing gum (U.S. Pat. No. 3,962,463). Further, U.S. Pat. No. 4,695,463 to Yang et al. is noted and discloses a flavor delivery system that relies on the immobilization of the flavor within a crosslinked hydrocolloid multivalent alginate or carageenenate matrix.

One exception to the adoption of flavor fixation is found in U.S. Pat. No. 4,157,401 to Stroz, et al., where a limonene derivative was introduced in combination with a quantity of unfixed flavor, on the basis that the limonene prevents the migration of the flavor to the water-soluble phase of the gum and resultingly, toward its premature release. This patent confirms the shortcomings of the use of unfixed flavor that were perceived in the art from the time of the patent forward to the present.

In view of the foregoing, a need therefore exists for the development of improved chewing gums particularly having high base content that are capable of offering extended flavor sensation in combination with improved shelf stability.

SUMMARY OF THE INVENTION

In accordance with the present invention, a gum composition is prepared that offers substantially improved and prolonged flavor release, along with other attributes in a high gum base system, by the use of a base formulation that yields a soft texture and chew at contents ranging from about 50% to about 90% by weight of the total gum composition in combination with the exclusive incorporation therein of a flavor component preferably in the free form. The flavor component may be prepared in free or spray-dried form or may be encapsulated, and is incorporated into the gum base in amounts of up to about 4% by weight thereof, and more particularly, in amounts of from about 1% to about 3% by weight, with preferred amounts ranging from about 1.5% to about 2.2% by weight. In a further aspect of the invention, a highbase reduced calorie content chewing gum having improved flavor extension is prepared by the incorporation therein of the flavor in the amount indicated above.

Applicants have found unexpectedly that the use of this softer base at high concentrations together with the incorporation of the flavor component into the gum composition in this fashion extends rather than foreshortens the flavor experience and secondarily enhances the other sensory properties of the resulting gum composition. The present gum base not only retains the flavor over a substantially extended period during the chew, but unexpectedly releases a greater percentage of the total flavor content during the chewing experience. This result is contrary to expectations since experience and the patent literature teach that higher amounts of base allow for greater possibility of entrapment of flavor rather than flavor release. As a result, the flavor sensation of the present high base formulation exceeds that of conventional low base gums without the addition of substantially larger amounts of flavor as has been the experience with prior high base formulations. Likewise, the flavor component is believed to act as a plasticizer and texturizing agent to the gum base to further enhance the softness of the chew. Release of the flavor in the present invention is more controlled throughout the chew rather than just "dumping" up front.

The chewing gum composition of the present invention contains a gum base in quantities ranging from about 50% to about 90% by weight of the composition, and the corresponding carbohydrate content of the composition is reduced to from about 7% to about 45% by weight thereof with the remaining ingredients, such as sweeteners, softeners and the like present in conventional amounts.

More particularly, the gum base may be present in an amount of from about 60% to about 70% by weight, and the carbohydrate content may range from about 10% to about 30% by weight thereof, with a particularly preferred composition containing a gum base in an amount from about 60% by weight to about 65% by weight and a carbohydrate content ranging from about 25% by weight to about 30% by weight.

In a preferred embodiment, the present chewing gum composition may be prepared with the gum base disclosed in parent application Ser. No. 939,918, incorporated herein by reference. Accordingly, the preferred reduced calorie gum base utilizes a particular combination of elastomer, polyvinyl acetates of medium molecular weight, acetylated monoglyceride and a wax having a melting point below about 60° C. This particular combination of essential ingredients yields a gum base capable of incorporation into chewing gum compositions in increased percentage by weight without the use of an undue multiplicity of ingredients. The resulting gum composition offers the desired improvement in flavor release in combination with the other advantages conferred by the base.

The chewing gum compositions of the present invention, as noted earlier, exhibit enhanced flavor extension, and in addition offer extended shelf stability with reduced caloric content. The reduction in carbohydrate content possible with the present gum compositions reduces the tendency of the flavor to be carried out with the carbohydrates without diminishing the other critical properties of the gum, and thus facilitates acceptable shelf stability for these gum products. Moreover, the present gum compositions advantageously avoid the inclusion of an undue multiplicity of ingredients and can be simply prepared by conventional gum formulating procedures.

Accordingly, it is a principal object of the present invention to provide a gum composition offering extended flavor sensation.

It is a further object of the present invention to provide a chewing gum as aforesaid that offers the aforenoted property together with reduced and/or low-caloric content.

It is a yet further object of the present invention to provide a gum composition as aforesaid that is prepared with a high base content.

Other objects and advantages will be apparent to those skilled in the art from a consideration of the ensuing description which proceeds with reference to the following illustrative drawings.

BRIEF DESCRIPTION OF THE DRAWINGS

The FIGURE is a graph depicting the results of comparative chew panel testing of the inventive compositions against a known chewing gum formulation.

DETAILED DESCRIPTION OF THE INVENTION

The present invention relates to a chewing gum composition offering extended flavor release comprising:
 (a) a gum base present in an amount of from about 50% to about 90% by weight;
 (b) a carbohydrate component present in an amount of from about 7% to about 45% by weight; and
 (c) a flavor component present in an amount of up to about 4% by weight.

This is accomplished by the combination of a gum base formulation exhibiting improved softness and flavor release and the incorporation into the gum base of a flavor component in an amount ranging up to about 4% by weight of the gum composition. The flavor component may be prepared in a variety of forms including spray-drying, encapsulation and free form, and the gum composition may contain a high percentage of gum base and a relatively low percentage of water-soluble ingredients. The incorporation of the flavor into the high base composition has unexpectedly been found to more evenly stabilize and thereby extend flavor release, and overcomes the tendency of conventional chewing gum formulations with lower gum base concentrations to diminish in flavor intensity within five to seven minutes of chewing.

A secondary advantage of the chewing gum composition of the present invention is that the high percentage of chewing gum base exhibits improved plasticity and other desirable textural characteristics without the need for including additional texture modifying agents. While not wishing to be bound to any particular theory of operation, it is believed that the flavor when intimately admixed with the gum base of the present invention further plasticizes the latter and thereby improves its properties, while the gum base on its part, releases the flavor with a more even, increased release rate to promote the extended flavor sensation.

The flavor component of the present invention may be utilized in amounts of up to about 4% by weight, more particularly from about 1% to about 3% by weight, and preferably in amounts of from about 1.5% to about 2.2% by weight of the chewing gum composition. Suitable flavors useful in accordance with the present invention are unlimited and extend to all those flavors conventionally in use in comestible products and which are capable of incorporation and use in their free form. Thus, for example, the flavors may include those derived from essential oils, as well as those flavors characterized as either natural or artificial fruit flavors. Essential oils would include flavors, such as cinnamon, spearmint, peppermint, birch, anise, wintergreen and the like. Natural fruit flavors derived from fruit essences would include apple, pear, grape, peach, strawberry, cherry, apricot, orange, watermelon, banana and the like. In addition, the invention extends to bean-derived flavors, such as coffee, cocoa, cola and the like, and nut-derived flavors, such as peanut, almond, as well as other pungent materials capable of preparation and incorporation in accordance herewith.

The present chewing gum composition includes a variety of wellknown ingredients that are present for their corresponding purposes. With respect to the gum base component of the compositions of the present invention, such component may be prepared in amounts ranging from about 50% to about 90% by weight of the composition and more particularly, from about 60% to about 70% by weight thereof. It is one of the features of the present invention that the base may be incorporated into the present gum composition in such increased quantity with an improved rather than a deleterious effect upon the properties of the resulting chewing gum product. In a particularly preferred embodiment of the present invention, the gum base may be present in an amount of from about 60% to about 65% by weight of the resulting chewing gum composition.

The gum base may be prepared from known water-insoluble gum base materials and may, therefore, include materials such as chicle, jelutong, guttakay, crown gum, natural rubber, balata, guttapercha, lechi caspi, sorva or mixtures thereof, as well as elastomers and synthetic gums, such as styrene-butadiene rubber (SBR), polyisobutylene, polyisobutylene-isoprene copolymers, polyethylene, polyvinylacetate and the like. In the instance where the gum base of parent application Ser. No. 939,918 is prepared, a medium molecular weight polyvinylacetate (PVA) is employed either alone or in conjunction with low molecular weight PVA.

The gum base composition may also contain elastomer solvents to aid in softening the rubber component. Such elastomer solvents may comprise methyl, glycerol or pentaerythritol esters of rosins or modified rosins, such as hydrogenated, dimerized or polymerized rosins, or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin, and mixtures thereof. The solvent may be employed in an amount ranging from about 2% to about 75% and preferably from about 7% to about 70% by weight of the gum base. In a particular preferred embodiment, in accordance with parent application Ser. No. 939,918, the elastomer solvent may be present in amounts ranging from about 2% to about 12% and preferably from about 7% to about 11% by weight of the gum base.

In a preferred embodiment, the gum base of the present invention may correspond to the gum base composition disclosed in parent application Ser. No. 939,918, incorporated herein by reference. Accordingly, the gum base composition may comprise:

(a) about 0.5 to about 20% elastomer;
(b) about 10% to about 25% of a polyvinyl acetate having a medium molecular weight of about 35,000 to about 55,000;
(c) about 4.5% to about 10% acetylated monoglyceride;
(d) about 6% to about 10% of a wax having a melting point below about 60° C.; and
(e) remaining amounts of a material selected from the group consisting of elastomer solvent, emulsifiers, plasticizers, fillers and mixtures thereof.

Naturally the foregoing formulation is merely illustrative and is presented herein in fulfillment of the obligation to present a best mode for the practice of the invention.

The present gum composition may likewise include conventional additives such as softeners which may be present in amounts ranging broadly up to about 40% by weight of the final gum composition, and preferably in amounts up to about 20% by weight thereof. Various liquid softeners are contemplated and would include materials such as corn syrup, sorbitol solution, hydrogenated starch hydrolysate, gum solutions and combinations thereof. These materials are conventionally added to provide the desired texture to the final product and to thereby enhance its chew.

Similarly, plasticizers may be added to the gum composition of the present invention in comparable amounts to those of the softeners. The plasticizers may include materials such as glycerin, lecithin, hydrogenated cotton seed oil, lanolin, stearic acid, sodium stearate, potassium stearate, glycerol triacetate, mineral oil, vegetable oil and the like. These ingredients may be utilized either individually or in admixture with each other. In the instance where the chewing gum base of parent application Ser. No. 939,918 is employed, these ingredients may be preferably present in aggregate in amounts of from about 9% to about 17% by weight of the gum base composition. Further, certain plasticizers are preferred and include the hydrogenated vegetable oils, such as soybean oil and cotton seed oil, which may be employed alone or in combination in amounts ranging from about 5% to about 14% by weight and preferably from about 5% to about 13.5% by weight.

The gum compositions likewise contain sweetening agents as part thereof. The sweetening agents are selected from a wide range of materials, such as water-soluble sweetening agents, water-soluble artificial sweeteners, and dipeptide-based sweeteners, including mixtures thereof. Without being limited to particular sweeteners, representative materials include:

A. Water-soluble sweetening agents, such as monosaccharides, disaccharides and polysaccharides, such as xylose, ribose, glucose, mannose, galactose, fructose, dextrose, sucrose, sugar, maltose; partially hydrolyzed starch or corn syrup solids; chlorinated sucrose derivatives such as sucralose; and sugar alcohols, such as sorbitol, xylitol, mannitol and mixtures thereof.

B. Water-soluble artificial sweeteners, such as soluble saccharin salts, i.e., sodium or calcium saccharin salts, cyclamate salts, acesulfame-K and the like, and the free acid form of saccharin.

C. Dipeptide-based sweeteners, such as L-aspartyl-L-phenylalanine methyl ester and materials described in U.S. Pat. No. 3,492,131 and the like.

In general, the amount of sweetener will vary with the desired amount of sweetness selected for a particular chewing gum. This amount will normally be about 0.01% to about 60% by weight when using an easily extractable sweetener. The water-soluble sweeteners described in category A are preferably used in amounts of about 25% to about 60% by weight. By contrast, the artificial sweeteners described in categories B and C are used in amounts of about 0.05 to about 5.0% and preferably from about 0.05% to about 2.5% by weight of the final gum composition. These amounts are necessary to achieve a desired level of sweetness independent from the perception of flavor/sweetness level achieved from the flavor component.

The chewing gum compositions of the invention may likewise contain additional additives including bulking agents, such as fillers. Illustrative fillers would include aluminum hydroxide, alumina, aluminum silicate, calcium carbonate, talc, dibasic calcium phosphate (anhydrous and dehydrate) and mixtures thereof. The amount of the filler may vary. In the instance where a gum composition corresponding to that of parent application Ser. No. 939,918 is being prepared, the amount of filler may range from about 15% to about 40% by weight of the gum base and preferably from about 20% to about 30% by weight.

The chewing gum composition of the present invention may be prepared in conventional fashion using standard techniques and equipment known to those skilled in the art. In a typical embodiment, the elastomer composition may be agitated with an elastomer solvent and/or plasticizers and/or emulsifiers for a period of about 1 minute to about 30 minutes. Thereafter, the PVA component of the base may be blended in to the first mixture to assure the uniform blending of the PVA with the elastomer. The remainder of the base constituents are then added in bulk, either incrementally or stepwise while the resulting mixture is blended for a further equivalent period of time. Thereafter, the gum base may be formulated into the final chewing gum composition, again utilizing standard procedures and equipment by the combination of the base with the remaining ingredients, such as the sweeteners, flavors, colorants and the like. In this connection, the blending of the flavor component with the remainder of the constituents of the gum composition is not critical so long as uniform blending is achieved.

As indicated earlier, the present chewing gum composition may be prepared in either sugar or sugarless formulations with gum base content ranging as high as 90%, in the instance where a reduced-calorie product is desired. In addition, the chewing gum product may be prepared as anhydrous, substantially anhydrous or moisture containing.

More particularly, the preparation of the present gum compositions could involve first melting of the gum base at a temperature ranging from about 45° C. to about 90° C., and the mixing of the gum base in a kettle with a liquid softener and/or an emulsifier for from 2 to 8 minutes. To this mixture, two-thirds to three-quarters of the sweetener ingredient and colorant, if any, are added, and mixing is continued for from about 1 to about 4 minutes. The remaining sweetener may then be added while mixing is continued, and a flavor component may then be slowing added.

The mixing of the resulting material may be maintained for a period of from about 1 to about 4 minutes. A humectant may be added to the resulting mixture and mixing continued for a further period of from about 1 to about 4 minutes. The resulting gum composition may then be discharged from the kettle and formed into its desired shape, such as strips, slabs, chunks, ball ropes, and/or center-filled products. The chewing gum compositions of this invention may additionally include various coloring agents such as titanium dioxide, as well as such liquid colorants as are accepted and conventionally used for food colorings herein.

As used in the Specification and Claims, the term "reduced calorie" shall mean a calorie content two-thirds or less that of conventional chewing gum compositions. The terms "tight" or "rubbery" apply to the nature of the chew and refer to a chewing gum composition which upon chewing requires a large amount of muscular chewing effort to masticate the formulation, or a chewing gum that provides a gum bolus that is difficult to deform and exhibits high elasticity and bounce.

The following Examples are given to illustrate the invention but are not deemed to be limiting thereof. All percentages given throughout the Specification are based upon weight unless otherwise indicated.

EXAMPLE 1

Chewing gum compositions were prepared in accordance with the present invention for the purpose of comparing the improved properties of extended flavor release with the flavor release of gum compositions prepared within conventional parameters of ingredients and proportions. Accordingly, two compositions having high base concentrations were prepared with chewing gum bases having compositions corresponding to those disclosed in parent application Ser. No. 939,918, and having free flavor, and are designated Samples B and C. A third composition was prepared with conventional ingredients including spray dried flavor and generally corresponding in composition to the comparative compositions prepared in patent application Ser. No. 939,918, and is designated control Sample A. The proportions of ingredients of Samples A, B and C are listed in Table 1, below.

TABLE 1

| INGREDIENT | AMOUNT (WEIGHT PERCENT) | | |
|---|---|---|---|
| | Sample A (Control) | Sample B | Sample C |
| BASE | 28.02 | 65 | 68 |
| POLYOL | 58.62 | 27.64 | 24.36 |
| FLAVOR | 1.35 | 2.2 | 1.84 |
| EMULSIFIER | 2.66 | 0.71 | 1.35 |
| SWEETENER | 0.35 | 0.45 | 0.45 |
| GLYCERIN | 9.00 | 4.0 | 4.0 |

EXAMPLE 2

Comparative blind chew panel testing was conducted with samples of chewing gum prepared from the compositions set forth above in Table 1. The test samples were prepared in identical fashion to each other varying only in their compositions and ingredients. The test samples of gum were given to a chew panel whose members all chew on a regular basis, for the purpose of screening the samples. During the experiment, each panelist was asked to evaluate the prototypes by the attributes listed below and to render an opinion based on the following numerical scale:

| 0 | 10 | 20 | 30 | 40 | 50 | 60 | 70 | 80 | 90 | 100 |
|---|---|---|---|---|---|---|---|---|---|---|
| VERY POOR | | | | | | | | | | EXCELLENT |
| LOW (FLAVOR) | | | | | | | | | | HIGH (FLAVOR) |
| SOFT (CHEW) | | | | | | | | | | HARD (CHEW) |

The panelists were asked to rate the samples at intervals of 30 seconds, 2, 6, 10 and 15 minutes. The attributes rated were chew, flavor and sweetness. At 30 seconds and 15 minutes both intensities and liking were rated, while at all other time intervals only intensities were rated. Overall liking of each gum sample was rated at the end of the chew.

The results of the ratings assigned by each of the panelists to each of control Sample A and inventive Samples B and C were averaged together and then compared as to flavor, sweetness and chew characteristics of the respective samples. The data are expressed in graphical form in the FIGURE.

As can be seen from the FIGURE, the conventional gum exhibited marked diminution in flavor intensity within 2 minutes after the commencement of chewing, with intensity dropping 20 units in this time. By contrast, the samples of the invention while offering a somewhat lesser initial flavor intensity, exhibited a diminution of about 5 units during this same period. More significant however, is the fact that after 10 minutes of chewing, the inventive gum samples had relatively minimal reductions from initial intensity of from 10 to 20 units, to 50 and 45 units, respectively, while the control gum sample had diminished 45 units to about 25 units. Clearly, the inventive gums offered an appreciable extension in flavor intensity with essentially the same overall flavor content, confirming that the compositions of the present invention are significantly improved in their efficiency and longevity of flavor delivery.

This invention may be embodied in other forms or carried out in other ways without departing from the spirit or essential characteristics thereof. The present disclosure is therefore to be considered as in all respects illustrative and not restrictive, the scope of the invention being indicated by the appended Claims, and all changes which come within the meaning and range of equivalency are intended to be embraced therein.

What is claimed is:

1. A chewing gum composition capable of releasing increased amounts of flavor evenly over a longer release time using conventional flavor levels comprising:
   (a) a gum base present in an amount of from about 50% to about 90% by weight;
   (b) a carbohydrate component present in an amount of from about 7% to about 45% by weight; and
   (c) a flavor component present in an amount of up to about 4% by weight; wherein the gum base comprises in percentages by weight of the gum base;
       (1) about 0.5% to about 20% elastomer;
       (2) about 10% to about 25% of a polyvinyl acetate having a medium molecular weight of about 35,000 to about 55,000;
       (3) about 4.5% to about 10% acetylated monoglyceride;
       (4) about 6% to about 10% of a wax having a melting point below about 60° C.; and
       (5) remaining amounts of a material selected from the group consisting of elastomer solvent, emulsifiers, plasticizers, fillers and mixtures thereof.

2. The chewing gum composition of claim 1, wherein said gum base is present in an amount of from about 60% to about 70% by weight.

3. The chewing gum composition of claim 1 wherein said carbohydrate component is present in an amount of from about 10% to about 30% by weight.

4. The chewing gum composition of claim 1 wherein said gum base is present in an amount of from about 60% to about 65% by weight.

5. The chewing gum composition of claim 1 wherein said carbohydrate component is present in an amount of from about 25% by weight to about 30% by weight.

6. The chewing gum composition of claim 1 wherein said flavor component is present in an amount of from about 1% to about 3% by weight.

7. The chewing gum composition of claim 1 wherein said flavor component is present in an amount of from about 1.0% to about 2.2% by weight.

8. The chewing gum composition of claim 1 wherein the flavor component is selected from the group consisting of flavors derived from essential oils, artificial fruit flavors, natural fruit flavors, bean-derived flavors, nut-derived flavors, and mixtures thereof.

9. The chewing gum composition of claim 1 wherein said flavor is selected from the group consisting of cinnamon oil, spearmint oil, peppermint oil, oil of wintergreen, birch, anise, apple, pear, grape, peach, strawberry, cherry, apricot, orange, watermelon, banana, coffee, cocoa, cola, peanut, almond, and mixtures thereof.

10. The chewing gum composition of claim 1 further including an additive selected from the group consisting of fillers, extenders, plasticizers, sweeteners, softeners, colorants, and mixtures thereof.

11. The chewing gum composition of claim 10 wherein said sweeteners are present in an amount of from about 0.01% to about 60% by weight.

12. The chewing gum composition of claim 10 wherein said sweeteners are selected from the group consisting of natural sweetening agents, artificial sweeteners, dipeptide-based sweeteners, and mixtures thereof.

13. The chewing gum composition of claim 10 wherein said fillers are present in an amount of about 15% to about 40% by weight of said gum base.

14. The chewing gum composition of claim 10 wherein said fillers are selected from the group consisting of aluminum hydroxide, alumina, aluminum silicate, calcium carbonate, talc, dibasic calcium phosphate (anhydrous and dehydrate) and mixtures thereof.

15. The chewing gum composition of claim 10 wherein said softeners are present in an amount of up to about 40% by weight.

16. The chewing gum composition of claim 10 wherein said softeners are selected from the group consisting of corn syrup, sorbitol solution, hydrogenated starch hydrolysate, gum solutions, and mixtures thereof.

17. The chewing gum composition of claim 10 wherein said plasticizers are present in an amount of from about 9% to about 17% by weight of said gum base.

18. The chewing gum composition of claim 10 wherein said plasticizers are selected from the group consisting of glycerin, lecithin, hydrogenated cotton seed oil, lanolin, stearic acid, sodium stearate, potassium stearate, glycerol triacetate, mineral oil, vegetable oil, and mixtures thereof.

* * * * *